No. 884,891. PATENTED APR. 14, 1908.
R. B. BREWER.
CORN HARVESTER.
APPLICATION FILED OCT. 8, 1907.
3 SHEETS—SHEET 1.
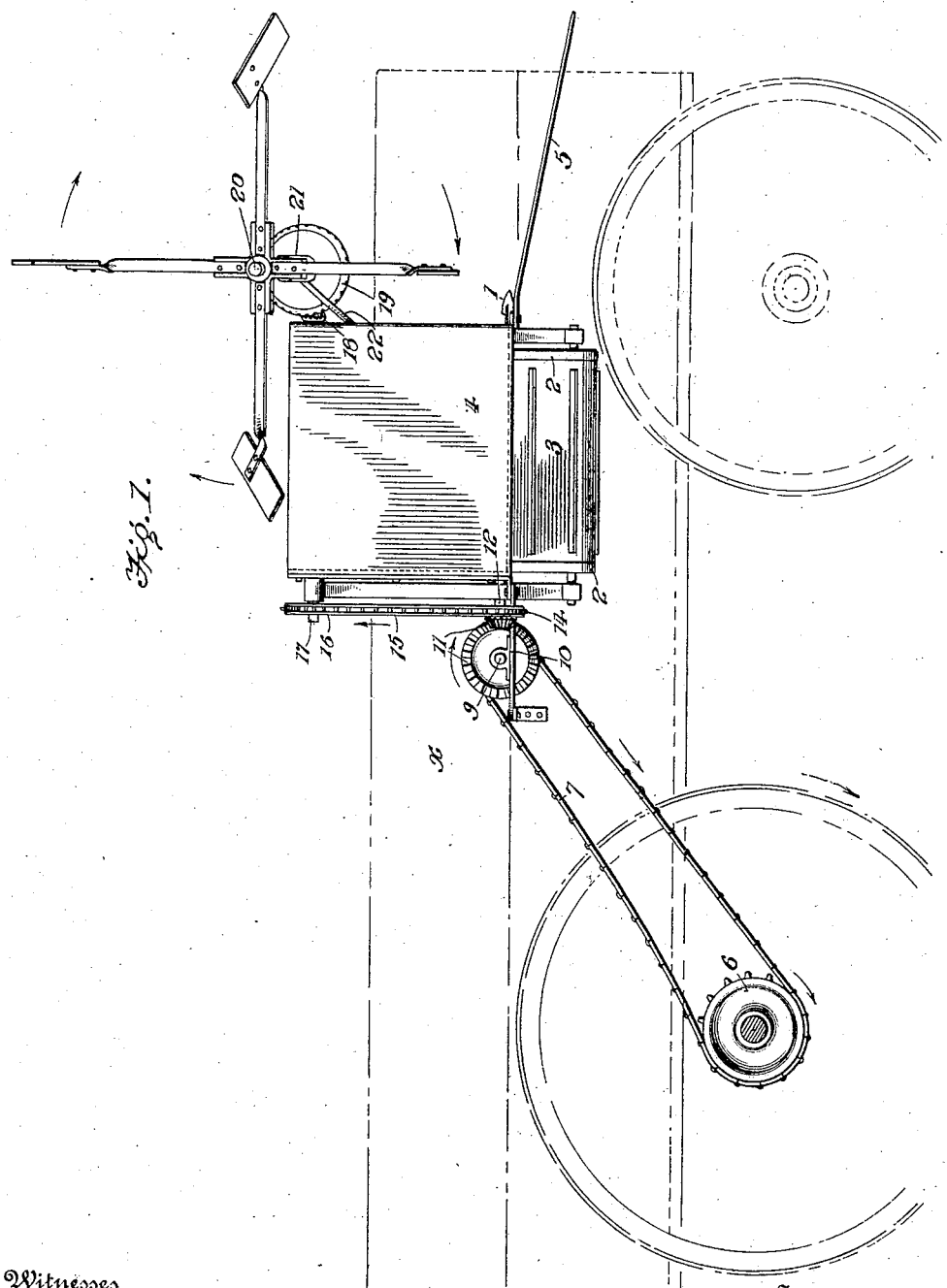
Witnesses
Inventor
Robert B. Brewer
By Attorneys No. 884,891. PATENTED APR. 14, 1908.
R. B. BREWER.
CORN HARVESTER.
APPLICATION FILED OCT. 8, 1907.
3 SHEETS—SHEET 2.
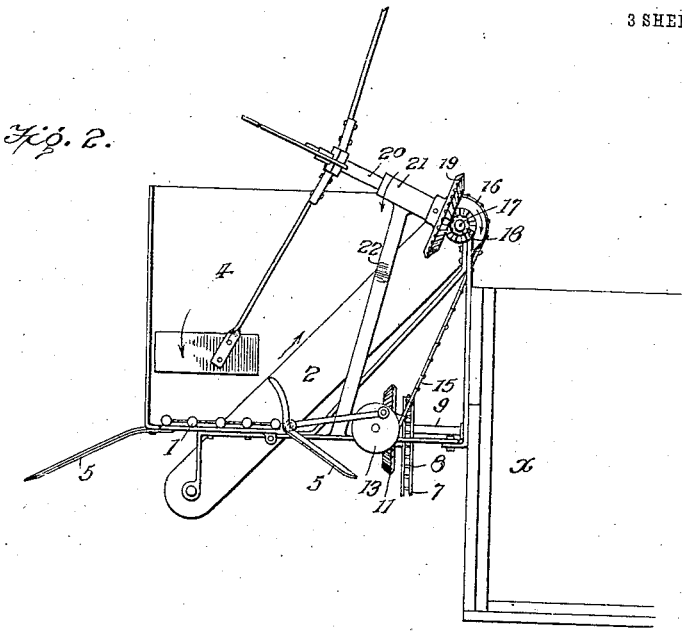
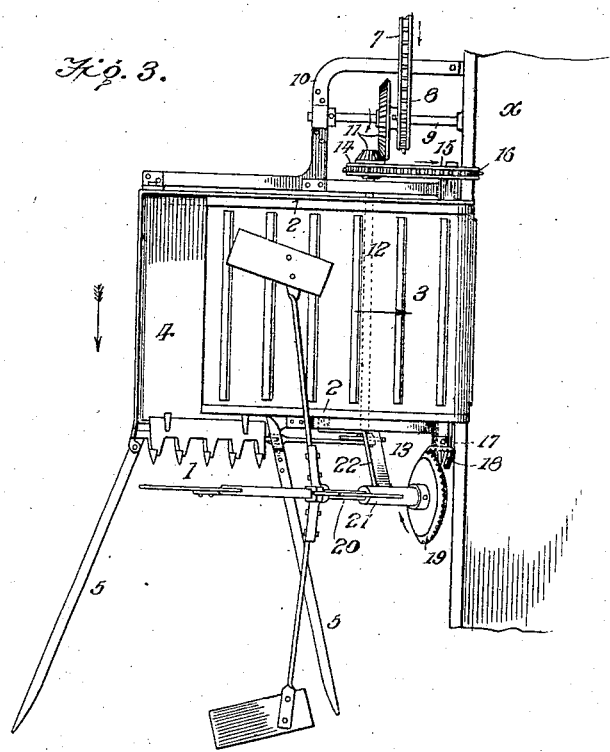
Witnesses
L. H. Schmidt
H. J. Bossé
Inventor
ROBERT B. BREWER,
By Attorneys Munn & Co.

No. 884,891. PATENTED APR. 14, 1908.
R. B. BREWER.
CORN HARVESTER.
APPLICATION FILED OCT. 8, 1907.
3 SHEETS—SHEET 3.
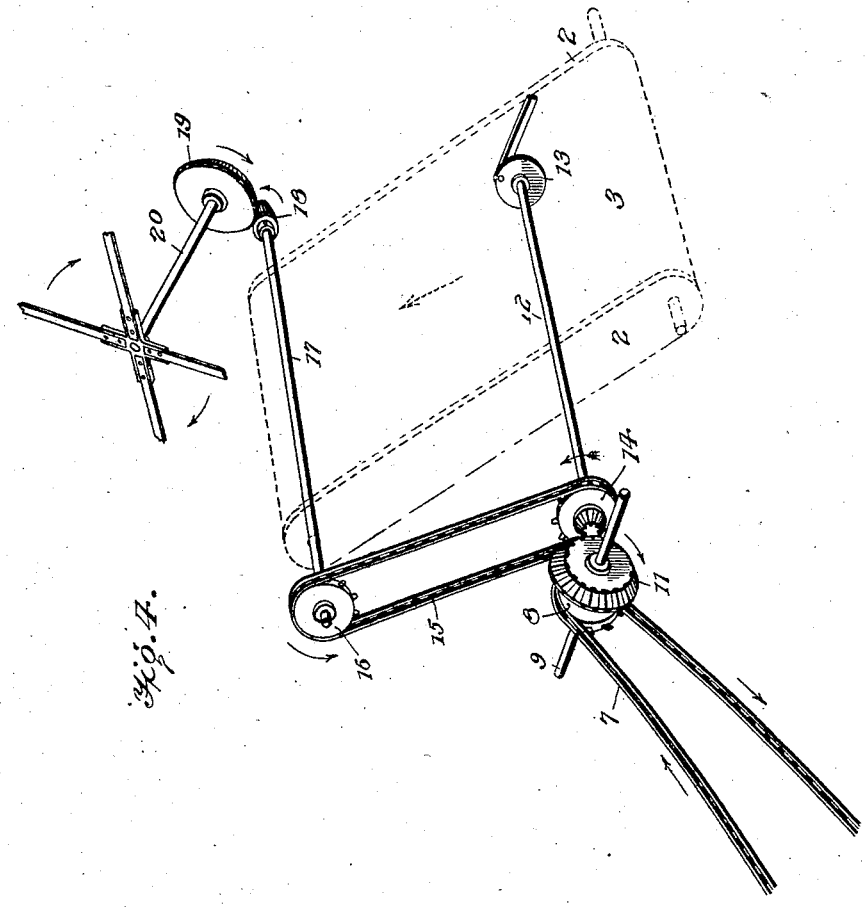
Witnesses
Inventor
ROBERT B. BREWER,
By Attorneys

UNITED STATES PATENT OFFICE.

ROBERT B. BREWER, OF OXFORD, KANSAS.

CORN-HARVESTER.

No. 884,891. Specification of Letters Patent. Patented April 14, 1908.

Application filed October 8, 1907. Serial No. 396,375.

*To all whom it may concern:*

Be it known that I, ROBERT B. BREWER, a citizen of the United States, and resident of Oxford, in the county of Sumner and State of Kansas, have invented an Improvement in Corn-Harvesters, of which the following is a specification.

My invention is an improvement in attachments for farm wagons, the same being adapted for cutting corn and delivering it into the wagon.

The invention is more particularly an improvement upon that for which I have filed application for Letters Patent, No. 366,147, allowed August 7, 1907. The attachment is particularly adapted for harvesting Kafir corn, but may be used for ordinary corn. I have devised changes in the construction, arrangement and combination of parts, whereby I have attained certain advantages, especially by reduction of the weight and cost of the attachment, and lessening side draft and leverage on the wagon body, while the efficiency of the apparatus has been increased The details of construction, arrangement and operation of parts are hereinafter described and shown in the accompanying drawing, in which Figure 1 is a side view showing my attachment in working position on the side of a farm wagon. Fig. 2 is a front view of the attachment, together with a portion of the wagon body. Fig. 3 is a plan view of the same parts shown in Fig. 2. Fig. 4 is a perspective view illustrating particularly the shaft and gear connections.

As in my previous invention, the entire attachment is secured by suitable means to the side of a wagon body X. A reciprocating cutter or sickle mechanism 1 is arranged horizontally at the front end of the frame, and in rear thereof is an endless conveyer comprising inclined frame bars 2 and an endless apron 3, provided with cross bars or lags, as usual in this class of inventions, the upper end of the conveyer projecting in practice over the edge of the wagon body so as to deliver corn therein as it is severed by the cutting mechanism and falls back upon the conveyer. A corn shield 4, preferably constructed of sheet metal, is arranged on the rear and outer side of the frame. Forwardly and downwardly projecting arms 5 are attached to the frame in position to guide the standing corn to the cutter 1. The movable parts of the attachment are driven from the rear axle of the wagon, the same being provided, as shown in Fig. 1, with a sprocket wheel 6 on which runs a chain 7 whose upper end runs on a sprocket 8 keyed, as indicated in Fig. 3, upon a short driving shaft 9, the latter being journaled at its outer end in a bracket 10 which is suitably secured to the main frame of the attachment and to the side of the wagon body X.

In my previous invention, the drive shaft was extended to the outer side or end of the shield, and there provided with a sprocket wheel from which a chain ran upward, at an inclination, to a reel shaft, the latter being arranged at the upper outer corner or edge of the corn shield. In this instance, the driving shaft is short and is operatively connected by bevel gears 11 with the shaft 12, which extends to the front of the attachment and is there provided with an eccentric 13 by which the sickle is reciprocated in the same manner as in my original invention. On the shaft 12 is mounted a sprocket wheel 14, from which a chain 15 runs to a sprocket wheel 16 keyed on the upper shaft 17 of the endless conveyer. This shaft is provided—see Figs. 2 and 3—on its forward end with a bevel pinion 18 that meshes with a bevel gear 19 mounted on the reel shaft 20. The latter is set at a slight inclination and supported in the sleeve 21 forming part of a bracket 22 supported on the main frame. Thus, while reducing the length of the primary drive shaft 9, I have also made the upper conveyer shaft the driver for the reel shaft. Hence, in place of the weight of the reel and attachments and means for driving it being supported at the outer upper edge of the corn shield, these parts are all located close to the wagon body, whereby the weight and cost of the attachment, and the leverage and side draft on the wagon body are greatly reduced, and the efficiency and ease of operation of the reel and conveyer increased. Among other things, a smaller number of chains suffices for driving the sprocket wheels, the number of the latter is also reduced, while the attachment as a whole is some thirty pounds lighter than the original.

I claim:

The improved corn-harvesting attachment for a wagon body, comprising a main frame and shield secured thereto, a conveyer 3 and conveyer frame 2 supported in said main frame in an inclined position, the upper shaft 17 of the conveyer being extended on each side of frame 2, a reel-driving shaft 20 geared with one end of the conveyer shaft and supported in an inclined position, the short primary driving shaft 9, and a supplemental driving shaft 12, geared therewith and extending transversely of the conveyer 3, a sprocket-and-chain mechanism connecting such supplemental driving shaft with the upper conveyer shaft, and mechanism arranged on the front of the attachment and operatively connected with the adjacent end of the supplemental driving shaft, as shown and described.

ROBERT B. BREWER.

Witnesses:
WOODFORD G. HURST,
OSSIAN E. RUCKER.